Patented Mar. 11, 1952

2,588,398

UNITED STATES PATENT OFFICE 2,588,398

PREPARATION OF GRANULAR POLYMERS

William C. Mast, Philadelphia, and Charles H. Fisher, Abington, Pa., assignors to the United States of America as represented by the Secretary of Agriculture No Drawing. Application November 16, 1948, Serial No. 60,394

8 Claims. (Cl. 260—86.1)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the production of synthetic polymeric materials. It particularly relates to methods for producing such polymers in a granular form. An object is to provide a method for producing polymers of a higher degree of purity.

We have found that granular polymers can be produced by forming a mixture comprising a polymerizable monomeric material and water, inducing polymerization of the monomer while agitating the mixture, thereby causing gradual increase in the consistency of the monomeric component of the mixture by polymerization, and subjecting the resulting partially polymerized material to kneading in contact with the aqueous phase of the mixture until polymerization is substantially completed. We have further found that in order to obtain a granular polymer, that is a polymerized product consisting entirely of small, discrete particles, it is indispensable that polymerization be effected in the presence of water under the aforementioned conditions. In the absence of water polymerization results in the formation of a viscous product which coalesces into a sticky agglomerate. The amount of water that must be present in the mixture during polymerization to cause granulation of tht resulting polymer must be at least about 5 percent by weight of the monomeric material. Depending on the nature of the monomeric material used and other components of the polymerization mixture, and the conditions whereby polymerization is induced, satisfactory results can be attained by using polymerization mixtures containing water in an amount that may vary from about 5 to about 55 percent by weight of the monomeric material.

According to the method of this invention the polymerization mixture comprising water and the monomeric material, and which also may include polymerization catalysts, initiators or activators, regulating agents, plasticizers and other modifiers is charged into a suitable vessel provided with stirring means adapted for agitating, kneading and malaxing the contents of the vessel. A mixer mill of conventional design with revolving mixing arms moving in opposite direction is very well adapted for use in our polymerization process. If the polymerization is conducted at elevated temperature, it is desirable to use a mixer that can be heated either electrically or with jacketed steam or hot water and provided with a vapor condenser. Suitable agitation of the polymerization mixture can be effected, however, by various other means such as sets of alternating stationary and moving blades rotating in an annular space, as exemplified in the processing equipment of the "Votator" type. Screw agitators may also be used and are advantageous when the process is conducted as a continuous operation. When volatile monomeric materials are used polymerization can be conducted under pressure in a closed system.

In general the process of this invention is applicable to the polymerization of any polymerizable monomeric material comprising a monomer mixture or a single polymerizable substance such as vinyl compounds, for example, vinyl esters like vinyl acetate or vinyl chloride, and polymerizable substances such as styrene, esters of acrylic and methacrylic acid such as alkyl acrylates and methacrylates, acrylonitrile and other acrylic monomers; isobutylene employed in conjunction with another polymerizable monomer, dienes like butadiene or isoprene and other polymerizable compounds used either singly or in combination.

Polymerization of the monomeric material can be induced by any conventional means such as heat, light and catalytic agents. Usually it is advantageous to induce polymerization by catalytic action preferably with application of heat. Suitable catalytic agents are polymerization catalysts or initiators like organic peroxides such as benzoyl, lauroyl, stearoyl peroxide, persulfates like ammonium or alkali-metal persulfate, and other analogous compounds commonly utilized as catalytic agents in the production of synthetic high molecular polymers. Polymerization can also be effected by the use of reduction activated or a redox system. Water soluble as well as monomer soluble polymerization catalysts, initiators or activators may be used. When a monomeric material is used which is soluble in water to an appreciable extent at polymerization temperature it is often advantageous to conduct the process in the presence of a water soluble polymerization catalyst, especially when the monomeric material is readily polymerizable, since such a procedure provides a convenient means of controlling the reaction rate of polymerization. Thus, for example, when our process is applied to the production of polymers of alkyl esters of acrylic or of methacrylic acid, which in their monomeric form are soluble in water at about 20–99° C. to an extent of about 0.1 to 2 percent, it is advantageous to utilize as polymerization catalysts water soluble compounds such as alkali persulfates, although monomer soluble catalysts like benzoyl peroxide and other organic peroxides can also be used. When substantially water insoluble, slowly polymerizable monomers like styrene or dienes are used, polymerization can be catalyzed by means of a monomer soluble catalyst such as an organic peroxide, or a water soluble catalyst such as alkali persulfate can be used in conjunction with a solubilizing agent for the monomer, for example, a metallic soap, to enhance the interaction of the catalyst with the monomeric material. Under such conditions any of a number of well-known, surface active solubilizing agents suitable for use in effecting oil-in-water or water-in-oil solubilization can be utilized as solubilizing agents. (See, for example, McBain et al., J. Am. Chem. Soc. 49, 2230 and 51, 3534.)

Depending on the nature of the monomeric material various combinations of water soluble and monomer soluble oxidizing agents and reducing activators can be used to induce polymerization by means of a redox system, such as alkali persulfate and sodium bisulfite, benzoyl peroxide and hydroquinone, ascaridol and sodium bisulfite, hydrogen peroxide and catechol and so forth.

Upon completion of the polymerization process the resulting granular polymer is freed of water and traces of unreacted monomer by any suitable procedure, such as drying in a current of warm air either before or after removal from the polymerization vessel.

The physical characteristics of the polymers produced by our process can be modified by addition of suitable agents to the polymerization mixture. For example, addition of metallic soaps such as zinc stearate, calcium stearate, aluminum palmitate, or magnesium stearate and other fatty acid salts or di- or trivalent light metals, imparts to the granular polymers properties which facilitate handling and removal from equipment used in the polymerization. Fluid low molecular weight polymers can also be produced in a form well adapted for subsequent handling and processing by incorporating into the polymerization mixture chain-terminating agents such as dodecyl mercaptan.

Our process unlike those utilized in suspension polymerization does not require high speed agitation, nor is uninterrupted agitation a prerequisite of successful operation of our process. Whereas in suspension polymerization the partially polymerized globules coalesce into a solid mass if agitation is discontinued or its effectiveness impaired, thereby rendering impossible a completion of the operation, in the process of the present invention agitation can be stopped and then resumed within a reasonable time at any stage of the operation without adversely affecting the material treated.

Since our polymerization mixtures remain in freely flowing condition throughout the critical period of the operation, agitation of the mixture and kneading of the partially polymerized material can be conducted with a relatively small expenditure of mechanical energy.

The following examples are given as illustrative embodiments of a manner in which our process can be carried out in practice:

EXAMPLE I 1000 ml. water
1900 g. ethyl acrylate monomer
100 g. chloroethyl vinyl ether monomer
1.25 g. ammonium persulfate The above ingredients were charged into a 1-gallon mixer, the volume of the batch being just sufficient to cover the "sigma" type blades of the mixer. Agitation was started, running at about 40 R. P. M. and the batch was heated to reflux temperature in about 18 minutes. Heating under reflux was then continued for 1 hour and 52 minutes during which time the reflux temperature rose 29° F., from 177 to 206° F., and the reflux gradually lost its oily appearance, consisting at the end of the reaction time mostly of water. Heating and agitation were then discontinued and the top of the mixer removed. The material treated consisted of white fluffy granular particles of the polymer, similar in appearance to rice grains and free from any large adherent lumps. A small amount, approximately 200 cc., of excess water was poured off, and the batch was dried, with the mixer running by blowing in warm air, temperature approximately 70° C., at a rate of about 2 cu. ft. per minute. All the water and the small amount of monomer were removed after drying for 37 minutes, and the effluent air showed no condensate on a cold surface. The dry polymer was still in a granular form easily handled on a rubber mill and well adapted for molding. The Lactoprene EV elastomer thus obtained was compounded as shown in Table II.

EXAMPLE II

Polymerization in the absence of water.

Polymerization was conducted in the mixture described in Example I, using 1072 g. ethyl acrylate monomer, 56.3 g. chloroethyl vinyl ether monomer and 2.45 g. benzoyl peroxide. Since the reaction is difficult to control if all the material is added at once, the mixture was added in portions. The rate at which the mixture must be run into the mixer and the necessary amount of benzoyl peroxide were determined in preliminary experiments. Polymerization was conducted at reflux temperature 206° F. and was completed in 65 minutes. When the cover of the mixer was removed, the polymerized material was found to consist of one large lump of solid polymer having a very strong monomer odor. The polymer was sheeted out with difficulty on a rubber mill and even in this condition the strong monomer odor persisted for several weeks. The product was not suitable for compounding and testing. It was, however, compounded with difficulty but failed to cure under curing conditions.

EXAMPLE III 1000 ml. water
1900 g. ethyl acrylate monomer
100 g. chloroethyl vinyl ether monomer
0.65 g. potassium persulfate
13 g. magnesium stearate The batch was polymerized as described in Example I. The polymerization was completed in 2 hours and the drying required 55 minutes. The resulting granular product was similar to that of Example I but the particles were somewhat smaller and more uniform in size, both before and after drying. The dry granular polymer was easily removed from the mixer. Due to the incorporation of a lubricant, magnesium stearate, in the initial mixture, the blades and bottom of the mixer were very easily freed of any adhering particles of the polymer. The granular polymer was readily handled and compounded.

EXAMPLE IV 250 ml. water
1900 g. ethyl acrylate monomer
100 g. chloroethyl vinyl ether monomer
0.75 g. potassium persulfate
20 g. calcium stearate The batch was polymerized as described in Example I. Polymerization was completed in 2 hours and 50 minutes and the drying time was 55 minutes. The granular polymer so obtained was white, fluffy and the particles uniform in size were approximately as large as those obtained in Example I. The polymer was suitable for compounding.

EXAMPLE V 250 ml. water
1900 g. ethyl acrylate monomer
100 g. chloroethyl acrylate monomer
0.75 g. potassium persulfate
20 g. calcium stearate The batch was polymerized and dried as described in Example I. Polymerization was completed in 2 hours and 50 minutes and the drying time was 55 minutes. The dry, granular polymer was similar to the product of Example III.

EXAMPLE VI 160 ml. water
400 g. ethyl acrylate monomer
1.2 g. benzoyl peroxide The polymerization and drying were conducted in a manner analogous to the procedure described in Example I. The batch was heated to reflux in 6 minutes and polymerized by refluxing for 55 minutes. The polymer was air dried for several days at room temperature. The granular polymer consisted of particles which were less uniform in size than those of the products described in the foregoing examples. The polymer could be removed, however, from the blades and bottom of the mixer and was suitable for compounding.

EXAMPLE VII 160 ml. water
360 g. ethyl acrylate monomer
40 g. dioctyl phthalate plasticizer
1 g. ammonium persulfate Polymerization was conducted as described in Example I for 1 hour at reflux temperature of 166°–198° C. The granular polymer was air dried. The product so obtained was similar to that of the foregoing Example VI and was suitable for compounding. The following example illustrates the application of our polymerization technique to the production of liquid, low molecular weight polymeric material.

EXAMPLE VIII 160 ml. water
400 g. ethyl acrylate monomer
2 g. dodecyl mercaptan
8 g. ammonium persulfate
3 g. sodium bisulfite Polymerization was conducted as described in Example I and was completed in 53 minutes at reflux temperature 150°–200° C. Water and traces of unreacted monomer were removed by steam distillation for thirty minutes. The dry polymeric material was a brown viscous liquid.

A solid, granular polymer is obtained by the same procedure if the mixture is polymerized in the absence of any chain transfer agent such as dodecyl mercaptan.

EXAMPLE IX 155 ml. water
135 g. of 30% colloidal silica solution (2% silica on monomer)
1900 g. ethyl acrylate monomer
0.75 g. potassium persulfate
100 g. chloroethyl vinyl ether The batch was polymerized as described in Example I. Polymerization was completed in 1 hour and 10 minutes and the drying time was 31 minutes. The granular polymer so obtained was white, tough, fluffy, and the particles were uniformly small in size. The silica assists in the granulation process.

In each of the following Examples X–XVI, wherein all parts are by weight, the polymerization was effected as described in Example I, using 95 parts ethyl acrylate monomer, 5 parts chloroethyl vinyl ether monomer, 12.5 parts water and 0.037 part potassium persulfate. All the polymers thus obtained were white, fine granular products. The metal soap lubricants used and the experimental conditions are shown in the following table:

*Table I*

| Example No. | Lubricant Percent [1] | Reflux Temp. °C. | Polymerization Time (min.) | Drying Time (min.) | Drying Method |
|---|---|---|---|---|---|
| X | Ca-stearate, 3 | 80 | 105 | 37 | Hot air stream. |
| XI | Al-tristearate, 1 | 80 | 136 | 18 | Do. |
| XII | Al-distearate, 1 | 80 | 145 | 32 | Do. |
| XIII | Zn-stearate, 1 | 80 | 115 | 35 | Do. |
| XIV | Ca-stearate, 3 | 80 | 75 | 31 | House vacuum. |
| XV | Al-palmitate (OH)₂, 1 | 80 | 70 | 37 | Hot air stream. |
| XVI | Ca-stearate, 1 | 80 | 95 | 30 | Vacuum pump. |
| | Stearic acid, 0.5 | 80 | | | |

[1] Based on the weight of the polymerizable components.

The characteristics of the vulcanizates obtained from some of the products of the foregoing examples are shown in Tables II and III.

Table II
PROPERTIES OF VULCANIZED SAMPLES [1]

| Polymer of Example No. | Raw Mooney ML-4 [2] | Cure Minutes at 298° F. | Tensile Strength p. s. i. | Modulus at 200% Elongation | Ultimate Elongation Percent | Shore A Hardness |
|---|---|---|---|---|---|---|
| I | 51.9 | 120 | 1,240 | 390 | 590 | 46 |
| II | 22.0 | 120 | (5) | (5) | (5) | (5) |
| III [3] | 52.8 | 30 | 1,620 | 580 | 540 | 46 |
|  |  | 60 | 1,690 | 640 | 500 | 47 |
|  |  | 120 | 1,710 | 870 | 400 | 50 |
| IV [4] | 57.8 | 30 | 1,580 | 490 | 530 | 45 |
|  |  | 60 | 1,810 | 750 | 440 | 46 |
|  |  | 120 | 1,740 | 790 | 420 | 50 |
| V | 55.5 | 30 | 1,715 | 580 | 520 | 45 |
|  |  | 60 | 1,710 | 610 | 490 | 45 |
|  |  | 120 | 1,740 | 650 | 480 | 45 |
| IX | 63.5 | 30 | 1,540 | 700 | 500 | 48 |
|  |  | 60 | 1,630 | 820 | 450 | 48 |
|  |  | 120 | 1,690 | 970 | 410 | 49 |

[1] Compounding recipe: 100 quarts polymer, 1 part tetramethyl thiuram monosulfide, 2 parts sulfur, 2 parts triethyl-trimethylenetriamine, 1 part stearic acid, 50 parts semi-reinforcing furnace carbon black.
[2] See: Taylor, Fielding, and Mooney, "Development and Standardization of Tests for Evaluating Processibility of Rubber," Symposium on Rubber Testing, Am. Soc. for Testing Materials, 1947.
[3] No stearic acid added.
[4] Only 0.5 part stearic acid added.
[5] Sample badly pitted; does not cure.

Table III
PROPERTIES OF VULCANIZED SAMPLES [1]

| Polymer of Example No. | Raw Mooney ML-4 | Cure Minutes at 298° F. | Tensile Strength p. s. i. | Modulus at 200% Elongation | Ultimate Elongation Percent | Shore A Hardness |
|---|---|---|---|---|---|---|
| X | 51.0 | 30 | 1,660 | 560 | 530 | 48 |
|  |  | 60 | 1,760 | 680 | 470 | 50 |
|  |  | 120 | 1,770 | 820 | 410 | 50 |
| XI | 51.0 | 30 | 1,570 | 490 | 570 | 48 |
|  |  | 60 | 1,670 | 580 | 540 | 50 |
|  |  | 120 | 1,680 | 750 | 460 | 51 |
| XII | 51.9 | 30 | 1,525 | 550 | 550 | 47 |
|  |  | 60 | 1,580 | 590 | 520 | 49 |
|  |  | 120 | 1,640 | 770 | 465 | 50 |
| XIII | 53.0 | 30 | 1,565 | 440 | 620 | 46 |
|  |  | 60 | 1,000 | 600 | 490 | 49 |
|  |  | 120 | 1,700 | 820 | 425 | 50 |
| XIV | 53.2 | 30 | 1,670 | 590 | 490 | 46 |
|  |  | 60 | 1,805 | 710 | 475 | 48 |
|  |  | 120 | 1,900 | 880 | 415 | 49 |
| XV | 54.2 | 30 | 1,610 | 550 | 540 | 45 |
|  |  | 60 | 1,570 | 590 | 490 | 46 |
|  |  | 120 | 1,675 | 790 | 430 | 49 |
| XVI | 50.8 | 30 | 1,710 | 590 | 520 | 45 |
|  |  | 60 | 1,740 | 700 | 480 | 46 |
|  |  | 120 | 1,770 | 780 | 450 | 46 |

[1] Compounding recipe: 100 parts polymer, 1 part tetramethyl-thiuram monosulfide, 2 parts triethyltrimethylenetriamine and 50 parts semi-reinforcing furnace carbon black.

Similar polymerization products are obtained using, in place of ethyl acrylate in Examples I and III-XVI, other acrylates such as methyl, propyl, butyl and other alkyl acrylates, phenyl, benzyl, cyclohexyl acrylate, beta-methoxy-ethyl acrylate or ethylethoxyethyl acrylate. In place of chloroethyl acrylate other haloalkyl acrylates can be used, for instance 3-chloropropyl or 2,3-dichloropropyl acrylate. Chloroethyl-vinyl ether can be replaced by other polymerizable monomers like acrylonitrile, chloroallyl alcohol, 2-chloropropene, 2,3-dichloropropene, alpha-chlorostyrene, methyl vinyl ketone, dimethyl chloromaleate, beta-cyanoethyl acrylate, 2-methyl-2 nitro-1-propyl acrylate, alpha-chloroacrylonitrile, 2-chloroallyl pelargonate and the like. The aforesaid acrylates and other monomers can also be polymerized singly or copolymers can be obtained by conjoint polymerization in any proportions. Other persulfates, organic peroxides and similar polymerization catalysts, initiators or activators can be used in place of those utilized in the foregoing examples.

The invention is not restricted to the polymerization of acrylic and other monoolefinic monomers. It is within the broad purview of our invention to employ other monomeric substances such as dienes like butadiene and similar polymerizable compounds.

Having thus described our invention, we claim:

1. A non-suspension process of forming a granular polymer, comprising: inducing polymerization by heating, under reflux, at about 177° to 206° F., in the presence of ammonium persulfate as polymerization catalyst, a polymerizable mixture that essentially consists of about 1900 parts of ethyl acrylate monomer and 100 parts of chloroethyl vinyl ether monomer, in 1000 parts of water while agitating, the agitator operating at about 40 R. P. M., thereby causing coalescence of the partially polymerized monomer, and continuing the heating and subjecting the resulting agglomerate of partially polymerized monomer to kneading in contact with aqueous phase of the mixture until polymerization is substantially completed, to produce a granular polymer, the process being carried out under non-emulsifying conditions and without dissolution of the polymerizable material in organic solvent.

2. The polymerization method which comprises forming a mixture containing water and a lower alkyl acrylate in a weight relation of about 5 to 55 parts water to 100 parts of the alkyl acrylate, inducing polymerization by heating in the presence of a polymerization catalyst while stirring and kneading the mixture thereby causing coalescence of the partially polymerized monomer and subjecting the resulting agglomerate of partially polymerized monomer to kneading in contact with the aqueous phase of the mixture, to form a granular polymer, the process being further defined as a non-suspension process carried out under non-emulsifying conditions and without dissolution of the polymerizable material in organic solvent.

3. The process of claim 2 in which the polymerization is effected in the presence of alkali persulfate as the catalyst, and a water-soluble soap.

4. The process of claim 2 in which a minor amount of the alkyl acrylate is replaced by a polymerizable monomer taken from the group consisting of chloroalkyl vinyl ether, chloroalkyl acrylate, and acrylic nitrile.

5. The process of claim 2 in which the lower alkyl acrylate is ethyl acrylate, a minor amount of which is replaced by chlorethyl vinyl ether, the catalyst being an inorganic persulfate.

6. The process of claim 2 in which the lower alkyl acrylate is ethyl acrylate, a minor amount of which is replaced by chloroethyl acrylate.

7. The process of claim 2 in which the catalyst is taken from the group consisting of ammonium and potassium persulfate and a water-insoluble soap taken from the group consisting of stearates and palmitates of calcium, aluminum, magnesium and zinc is present during the emulsification.

8. The process of claim 1 in which the polymerization is carried out in the presence of a water-insoluble soap.

WILLIAM C. MAST.
CHARLES H. FISHER.

REFERENCES CITED

The following references are of record in the file of this patent:

UNITED STATES PATENTS

| Number | Name | Date |
|---|---|---|
| 2,140,048 | Fikentscher et al. | Dec. 13, 1938 |
| 2,161,481 | Marks | June 6, 1939 |
| 2,294,226 | D'Alelio | Aug. 25, 1942 |
| 2,300,566 | Hahn et al. | Nov. 3, 1942 |
| 2,372,108 | Neher et al. | Mar. 20, 1945 |
| 2,440,318 | White et al. | Apr. 27, 1948 |
| 2,473,929 | Wilson | June 21, 1949 |

FOREIGN PATENTS

| Number | Country | Date |
|---|---|---|
| 505,012 | Great Britain | May 1, 1939 |